United States Patent [19]
Nishikawa et al.

[11] Patent Number: 5,777,038
[45] Date of Patent: Jul. 7, 1998

[54] HIGH DIELECTRIC GRAFT COPOLYMER

[75] Inventors: Satoshi Nishikawa, Shiga-gun; Mihoko Aoyama, Kakogawa, both of Japan

[73] Assignee: Sunstar Giken Kabushiki Kaisha, Takatsuki, Japan

[21] Appl. No.: 558,776

[22] Filed: Nov. 15, 1995

[30] Foreign Application Priority Data

Nov. 15, 1994 [JP] Japan ............................. 6-280337
Dec. 1, 1994 [JP] Japan ............................. 6-298220

[51] Int. Cl.$^6$ ............................. C08F 259/08
[52] U.S. Cl. ............................. 525/295
[58] Field of Search ............................. 525/295, 293

[56] References Cited

FOREIGN PATENT DOCUMENTS 2226414  11/1974  France .

*Primary Examiner*—Christopher Henderson
*Attorney, Agent, or Firm*—Jacobson, Price, Holman & Stern, PLLC

[57] ABSTRACT

This invention provides an organic dispersion-type electroluminescence (abbreviated as "EL") element comprising a backing electrode, a reflective insulating layer, a luminescent layer, and a transparent electrode, wherein said reflective insulating layer comprises a high dielectric binder resin, an inorganic high dielectric material (i.e. powdery barium titanate), an impurity ion killer, and/or a hydrophobic hydrocarbon group-containing alkoxysilane compound, which is effective for inhibiting or preventing undesirable deterioration of dielectric properties and shortening of durability induced by the impurity ions present in the powdery barium titanate, and further a high dielectric graft polymer composition which is useful as a high dielectric binder resin used in the preparation of the reflective insulating layer and luminescent layer in said EL element. Said dispersion-type EL element has usually used as a back-lighting, for example, in liquid crystal display (LCD) element in word processing machines or note-type personal computer.

6 Claims, No Drawings

HIGH DIELECTRIC GRAFT COPOLYMER

TECHNICAL FIELD OF THE INVENTION

This invention relates to an organic dispersion-type electroluminescence element, a reflective insulating layer composition used for preparing said electroluminescence (abbreviated as "EL") element, and further relates to a high dielectric graft polymer composition which is useful as a high dielectric binder resin used in the preparation of the reflective insulating layer and luminescent layer in said EL element. More particularly, it relates to an organic dispersion-type EL element comprising a backing electrode, a reflective insulating layer, a luminescent layer, and a transparent electrode. wherein said reflective insulating layer comprises a high dielectric binder resin, an inorganic high dielectric material (i.e. powdery barium titanate), an impurity ion killer, and/or a hydrophobic hydrocarbon group-containing alkoxysilane compound, which is effective for inhibiting or preventing undesirable deterioration of dielectric properties and shortening of durability induced by the impurity ions present in the powdery barium titanate. It also relates to an improved dielectric binder resin: a high dielectric graft polymer prepared by graft-polymerizing a fluorine-containing polymer with a specific cyanoethylated (meth)acrylic monomer, which is useful as a binder resin for the reflective insulating layer and the luminescent layer in the preparation of the EL element.

PRIOR ART

Recently attention has been given to so-called "dispersion-type electroluminescence (EL) element", which has usually used as a back-lighting, for example, in liquid crystal display (LCD) element in word processing machines or note-type personal computer. The organic dispersion-type EL element comprises usually a laminate of a backing electrode, a reflective insulating layer, a luminescent layer and a transparent electrode, and the reflective insulating layer is usually prepared by incorporating a powdery inorganic high dielectric material into a high dielectric binder resin.

However, it has been found that when a powdery barium titanate is used as the inorganic high dielectric material in the preparation of said reflective insulating layer, the product has the following defects.

(i) Although powdery barium titanate has widely been used in view of its high dielectric constant and its reasonable price, the dielectric characteristics are remarkably deteriorated by the presence of moisture. It is assumed that the deterioration will be caused by dissolving out of impurity ions (e.g. alkali metal ions, alkaline earth metal ions) contained in the powdery barium titanate into the binder resin.

(ii) The organic dispersion-type EL element has less durability, that is, the luminance and luminescent efficiency are lowered with a lapse of time, while said EL element has various advantages for practical use, such as simple structure, easy availability, low cost, high resistance to bending (because of the shape: light and thin film).

It has been considered that such less durability (short life) of the EL element is due to moisture penetrated into the EL element, and hence, various means have been tried to avoid such penetration of moisture, such as application of a moistureproof package to the EL element, enclosing a drying agent or hygroscopic agent in the package, decrease of hygroscopic properties of the high dielectric binder resin, moistureproof coating of the luminescent particles, and the like, but those are not necessarily satisfactory, and hence, this problem is the most important one to be solved in the conventional EL element.

(iii) Although the mechanism of the shortening of life of said EL element due to moisture is not yet completely clarified, it has been assumed that it will be due to deterioration of the luminescent particles contained in the luminescent layer which will mainly be caused by increase of dielectric loss tangent (tan $\delta$) of the reflective insulating layer and the luminescent layer due to moisture. The increase of the tan $\delta$ means transformation of electric energy to heat, and it induces rising of temperature which induces in turn shortening of life of the EL element.

From the above viewpoint, it has mainly been studied to lower the tan $\delta$ of the high dielectric binder resin per se for the purpose of lowering of the tan $\delta$ of said reflective insulating and luminescent layers in EL element as well as to lower the hygroscopic properties of the high dielectric binder resin. Nowaday, these properties have been improved to some good extent but the improvement has become almost the critical points in the possible extent. Nevertheless, it has been found that even if the tan $\delta$ and the hygroscopic properteis of the high dielectric binder resin are lowered to the critical points, when the powdery barium titanate is incorporated, the tan $\delta$ of the reflective insulating and luminescent layers in EL element increases significantly by the presence of moisture, even very slight moisture. This defect is particularly seen in new type of EL element, so-called "package-less type EL element" which has no outer seal for moistureproof. Moreover, the increase of dielectric constant and tan $\delta$ due to moisture will cause not only the lowering of the characteristics of the element such as luminance, luminescent efficiency, life, etc. but also increase of load given to the invertor for driving which causes trouble of invertor.

BRIEF DESCRIPTION OF THE INVENTION

The present inventors have intensively studied to eliminate the problems of shortening of life and of deterioration of dielectric characteristics of the EL element due to moisturing and have found the following facts.

(1) When the powdery barium titanate is previously washed with a pure water to remove the water-soluble impurity ions, the above-mentioned defects may somewhat be improved, but it is still insufficient. Further, it gives another problem, that is, necessity of additional steps such as washing, filtering and drying, which causes cost up and further it requires to provide a draining treatment after washing.

(2) It is also effective to use a highly pure barium titanate powder, but it causes high cost, because when barium titanate is prepared by calcinating together barium oxide and titanium oxide, highly pure starting materials are required and it further requires removal of the unreacted barium oxide.

(3) It was also tried to insolubilize the impurity ions by adding various substances, such as acids or salts having acidic groups, e.g. sulfate group ($SO_4^{2-}$), carbonate group ($CO_3^{2-}$), bicarbonate group ($HCO_3^-$), oxalate group ($C_2O_4^{2-}$), phosphate group ($PO_4^{3-}$), pyrophosphate group ($P_2O_7^{4-}$), borate group ($BO_3^{3-}$); chelating agents, e.g. ethylenediamine tetraacetate (EDTA), acetylacetone, oxine, salicylic acid; polyvalent carboxylic acids, e.g. phthalic acid, trimellitic acid, pyromellitic acid, malonic acid, maleic acid, adipic acid; fatty acids, e.g. stearic acid, palmitic acid. Although a certain effect is obtained by such a means, the effect is still insufficient. The reason of less effect will be that those materials may be effective for insolubilization of alkaline earth metal ions but not effective for insolubilization of alkali metal ions. Moreover, the treatment will give bad affect on the materials.

(4) According to further intensive study by the present inventors, it has been found that the desired effects could be achieved by incorporating a specific impurity ion killer and/or at least one of specific alkoxysilane compounds containing a hydrophobic hydrocarbon group, or its esters or its ethers, without giving undesirable effects on the element.

Thus, an object of the present invention is to provide an improved reflective insulating layer composition which comprises a high dielectric binder resin, a powdery barium titanate, a specific impurity ion killer and/or an alkoxysilane compound containing a hydrophobic hydrocarbon group, or its esters or its ethers.

The present inventors have further found that a high dielectric graft polymer prepared by graft-polymerizing a fluorine-containing polymer with a cyanoethylated acrylic monomer has significantly excellent properties as a binder for the preparation of a reflective insulating layer and a luminescent layer in the organic dispersion-type EL element.

Thus, another object of the present invention is to provide an improved high dielectric graft polymer composition useful as a binder in the preparation of organic dispersion-type El element.

A further object of the invention is to provide an improved organic dispersion-type EL element having excellent durability. A still further object of the invention is to provide a process for producing a high dielectric graft polymer composition. These and other object of the invention will be apparent to those skilled in the art from the following description.

DETAILED DESCRIPTION OF THE INVENTION

The reflective insulating layer composition of the present invention comprises a high dielectric binder resin, a powdery barium titanate as an inorganic high dielectric material, and an ion killer for scavenging the impurity ions contained in the powdery barium titanate and/or at least one of an alkoxysilane compound containing a hydrophobic hydrocarbon group of the formula [I]:

wherein $R^1$ is a hydrophobic hydrocarbon group having 6 or more carbon atoms, preferably 8 or more carbon atoms, for example, aliphatic saturated hydrocarbon groups, aliphatic unsaturated hydrocarbon groups, aromatic hydrocarbon groups, and alicyclic hydrocarbon groups.

$R^2$ is an aliphatic hydrocarbon group having 1 to 4 carbon atoms, or vinyl group.

$R^3$ is methyl, ethyl or isopropenyl group.

m is an integer of 1 to 3, and n is an integer of 0 to 2, provided $1 \leq m+n \leq 3$, or an alkyl, alkenyl or phenyl ester of the alkoxysilane compound [I], or an alkyl, alkenyl or phenyl ether of the alkoxysilane compound [I].

The organic dispersion-type EL element of the present invention comprises a laminate of a backing electrode, a reflective insulating layer, a luminescent layer, and a transparent electrode, wherein said reflective insulating layer comprises a high dielectric binder resin, a powdery barium titanate, and an ion killer and/or at least one of an alkoxysilane compound containing a hydrophobic hydrocarbon group [I] or its ester or its ether as mentioned above.

The impurity ion killer used in the present invention (hereinafter referred to merely as "ion killer") includes any materials which can scavenge and insolubilize alkali metal ions and alkaline earth metal ions without affect on the dielectric characteristics of the reflective insulating layer, for example, inorganic ion exchanger containing hydroxy group and at least one element selected from the metals of IV-A group (e.g. Ti, Zr, Hf, etc.), IV-B group (e.g. Sn, Pb, etc.), V-A group (e.g. V, Nb, Ta, etc.), V-B group (e.g. P, As, Sb, Bi, etc.), VI-A group (e.g. Mo, W, etc.), VII-A group (e.g. Mn, etc.) and VIII group (e.g. Fe, Co, Ni, etc.) in Periodic Table, more specifically hydroxy group-containing acids such as antimonic acid, stannic acid, niobic acid, ferric acid, etc.

The impurity ions contained in the barium titanate include not only cations of the alkali metal or alkaline earth metal ions but also the corresponding anions. When the anion is hydroxide ion (OH-), it is not necessary to scavenge it (because the alkali metal ions or alkaline earth metal ions are converted into hydrogen ion ($H^+$) and then bound with $OH^-$ to become water), but sometimes an anion such as halogen ion coexists, and in such a case, the anion shall also be scavenged. In order to scavenge such anions (e.g. halogen ions), among the above-mentioned metal compounds, hydroxide compounds of metals such as Bi, Zr, Ti are preferably used. These compounds can exchange the anions such as halogen ions with $OH^-$. These cation-exchanger may be, rather preferably, used together with an anion-exchanger. The ion killers are commercially available, for example, a series of "IXE" products (manufactured by TOAGOSEI CO., LTD.).

The hydrophobic hydrocarbon group-containing alkoxysilane compounds of the formula [I] or esters or ethers thereof (hereinafter referred to as "hydrophobic alkoxysilane compound") adhere onto or react with the surface of particles of the powdery barium titanate, and thereby (a) the hydrophobic hydrocarbon group make hydrophobic the particle surface of the powdery barium titanate and thereby inhibit the access of moisture to the particles, or (b) the hydrophobic alkoxysilane compound coats the surface of particles and thereby dissolution of the impurity ions from the inner area of said particles is inhibited.

The hydrophobic alkoxysilane compounds [I] include the compounds of the formula [I] wherein $R^1$ is an aliphatic straight chain or branched chain saturated hydrocarbon group having 6 to 30 carbon atoms, preferably 8 to 20 carbon atoms, such as hexyl, heptyl, octyl, 2-ethylhexyl, nonyl, decyl, undecyl, dodecyl, tetradecyl, octadecyl, eicosanyl; an aliphatic unsaturated hydrocarbon group having 6 to 30 carbon atoms, preferebly 8 to 20 carbon atoms, such as hexenyl, heptenyl, octenyl, hexadecenyl, octadecenyl, eicosyl; an aromatic hydrocabon group having 6 to 20 carbon atoms, for example, phenyl, tolyl, xylyl, benzyl, phenethyl, naphthyl, diphenyl, nonylphenyl; and an alicyclic hydrocarbon group having 6 to 20 carbon atoms, such as cyclohexyl, cycloheptyl, cyclooctyl, isoboronyl, bicycloheptenyl, tricyclodecyl, and the like. $R^2$ is a straight chain or branched chain aliphatic hydrocarbon group having 1 to 4 carbon atoms such as methyl, ethyl, propyl, isopropyl, n-butyl, isobutyl, or tert-butyl, or vinyl group. $R^3$ is methyl, ethyl or isopropenyl group, and m is an integer of 1 to 3, and n is an interger of 0 to 2, provided $1 \leq m+n \leq 3$.

The alkyl, alkenyl or phenyl esters of the alkoxysilane compound [I] include esters of said alkoxysilane compound [I] with an alkyl having 1 to 4 carbon atoms (e.g. methyl, ethyl, propyl, isopropyl, n-butyl, tert-butyl, etc.), an alkenyl having 2 to 4 carbon atoms (e.g. vinyl, propenyl, methacryl, etc.), or phenyl; and the alkyl, alkenyl or phenyl ethers of the alkoxysilane compound [I] include ethers of an alkyl having 1 to 4 carbon atoms (e.g. methyl, ethyl, propyl, isopropyl, n-butyl, tert-butyl, etc.), an alkenyl having 2 to 4 carbon atoms (e.g. vinyl, propenyl, etc.), or phenyl.

Suitable examples of the hydrophobic alkoxysilane compounds are alkylalkoxysilanes such as tridecyltrimethoxysilane, tridecylmethyldimethoxysilane, undecyltrimethoxysilane, undecylmethyldimethoxysilane, diundecyldimethoxysilane, octadecyldimethylmethoxysilane, octadecyltrimethoxysilane, octadecylmethyldiethoxysilane, decyltrimethoxysilane, eicosyltrimethoxysilane, hexyltrimethoxysilane, hexylmethyldimethoxysilane, 2-ethylhexyltrimethoxysilane; alkenylalkoxysilanes, such as octenyltrimethoxysilane, hexenylmethyldimethoxysilane; alkoxysilanes having aromatic ring, such as phenyltriethoxysilane, benzyltriethoxysilane, phenethyltriethoxysilane, t-butylphenethyldimethylmethoxysilane; alkoxysilanes having an alicyclic hydrocarbon group, such as bicycloheptenyltriethoxysilane, bicycloheptenylmethyldimethoxysilane, cyclohexyldimethylethoxysilane, (cyclohexylmethyl)trimethoxysilane; and their esterified or etherified compounds with an alkyl group, an alkenyl group, or phenyl group. They are used alone or in combination of two or more thereof.

Other analogous compounds having similar properties are inclusive, for example, organic titanates having a long chain alkyl group, such as isopropyltriisostearoyl titanate, tetrastearoyloxy titanate, titanium stearate, and the like, which show also the effects of decreasing the affect from impurity, while they are less effective than those of the above hydrophobic alkoxysilane compounds.

The high dielectric binder resin includes any conventional binder resins for organic dispersion-type EL elements, for example, polyvinyl alcohol, cellulose or its derivatives (e.g. O-2,3-dihydroxypropylcellulose, etc.), a cyanoethylated product of a polymer containing a plural hydroxy groups (e.g. pullulan), a homo- or copolymer of a cyanoethylated acrylic monomer, a homo- or copolymer of vinylidene fluoride (e.g. fluororubber), other cyanoethylated pullulan ether, and the like.

The present inventors have also found a new high dielectric graft polymer which is particularly useful as a binder resin for preparing the reflective insulating layer and luminescent layer for the organic dispersion-type EL element.

The high dielectric graft polymer is prepared by graft-polymerizing a fluorine-containing polymer with a cyanoethylated (meth)acrylic monomer of the formula [II]:

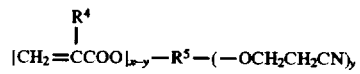

wherein x is a number of hydroxy groups originally attached to the $R^5$ group, preferably x is an integer of 2 to 4, y is a number satisfying the equation: $1 \leq y \leq x-1$, preferably y is an integer of 1 to 3, $R^4$ is H or $CH_3$, and $R^5$ is a straight chain or branched chain alkylene group having 1 to 8 carbon atoms, said alkylene group being optionally intervened by a group selected from -O-, an amino group, an imino group, a phenylene group or a hydrogenated phenylene group.

The starting fluorine-containing polymer includes homopolymers or copolymers of one or more of fluorine-containing monomer, such as vinylidene fluoride (VDF), hexafluoropropylene (HFP), chlorotrifluoroethylene (CTFE), tetrafluoroethylene (TFE), pentafluoropropylene (PFP), or perfluoromethyl vinyl ether (PFMVE), and copolymers of at least one of the above fluorine-containing monomers with a copolymerizable monomer as mentioned hereinafter. Fluororubber from vinylidene fluoride, i.e. a copolymer of polyvinylidene fluoride or vinylidene flurodie (VDF) with at least one of other fluorine-containing monomer (the above-mentioned HFP, CTFE, TFE, PFP, or PFMVE) is preferred one in view of the higher dielectric constant thereof (these copolymers are hereinafter referred to as "VDF copolymer"). In case of VDF copolymer, it has preferably the ratio of VDF in the range of 50 to 85 mole % so that it become rubber like substance. Besides, the fluorine-containing polymer has preferably radical active point, that is, it preferably contains iodine or bromine, because it is more easily graft-polymerized.

Another starting cyanoethylated acrylic monomer can be prepared by the following procedure.

Firstly, a polyhydroxyl compound having "x" valents of the formula: $R^5-(OH)_x$ (wherein $R^5$ and x are as defined above) (one mole) and acrylonitrile (y mole) are subjected to Michael addition reaction in the presence of an acidic or alkaline catalyst at a temperature of 20° to 100° C. for 1 to 48 hours to give a cyanoethylated compound of the formula:

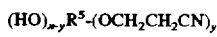   [III]

wherein $R^5$, x and y are as defined above.

Suitable examples of the polyhydroxyl compound are ethylene glycol, propylene glycol, 2-methyl-1,3-propanediol, 1,3-butylene glycol, 1,6-hexanediol, neopentyl glycol, diethylene glycol, dipropylene glycol, triethylene glycol, bisphenol A, hydrogenated bisphenol A, 1,4-dimethylolcyclohexane, glycerin, trimethylolethane, trimethylolpropane, trishydroxymethylaminomethane, pentaerythritol, and the like. Glycerin and pentaerythritol are particularly preferable.

The cyanoethylated compound obtained above is then esterified with a (meth)acrylic acid in an amount of (x-y) moles to the remained hydroxyl group(s) in the presence of an acidic catalyst at a temperature of 50° to 150° C. for 4 to 48 hours to give a hydroxy group-free cyanoethylated acrylic monomer.

The graft polymer of the present invention can be prepared by subjecting the above fluorine-containing polymer and the cyanoethylated (meth)acrylic monomer to a graft-polymerization optionally in an organic solvent or other liquid medium. The graft-polymerization includes any conventional one, such as a radical polymerization using a radical polymerization initiator, a radiation polymerization using radiation (e.g. γ-ray, electron rays, etc.) including suspension polymerization, bulk polymerization, solution polymerization, and the like. The cyanoethylated (meth)acrylic monomer is usually used in an amount of 10 to 90% by weight, preferably 20 to 70% by weight, based on the total weight of the starting cyanoethylated (meth)acrylic monomer and fluorine-containing polymer. When the amount of the cyanoethylated (meth)acrylic monomer is less than 10% by weight, the obtained graft polymer has insufficient dielectric constant, and on the other hand, when the amount is over 90% by weight, the product tends to diadvantageously show increased hydrophilic properties.

The organic solvent or other liquid medium used in the above graft-polymerization includes organic solvents, such as acetone, methyl ethyl ketone, γ-butyrolactone, ethyl acetate, butyl acetate, tetrahydrofuran, dimethylformamide, N-methylpyrrolidone. The polymerization reaction may be carried out in the form of a suspension in water or other organic solvent which is not a solvent for the fluorine-containing polymer.

The radical polymerization initiator used in the graft polymerization include, for example, peroxides (e.g. ketone peroxide, benzoyl peroxide, peroxyketal, hydroperoxide, dialkyl peroxides, diacyl peroxides, peroxy esters, peroxy dicarbonates, etc.), diazo compounds (e.g. 2,2'-azobis(4-methoxy-2,4-dimethylvaleronitrile), 2,2'-azobis(2-cyclopropyl-propionitrile), 2,2'-azobis(2,4-dimethylvaleronitrile), 2,2'-azobis(isobutyronitrile), 2,2'-azobis(2-methylbutyronitrile), 1,1'-azobis(cyclohexane-1-carbonitrile), 1-[(1-cyano-1-methylethyl)azo]formamide,2-phenylazo-4-methoxy-2,4-dimethylvaleronitrile, and the like. In case of radiation polymerization using a radiation, the above polymerization initiator is not necessarily used.

In the above graft polymerization, there may also be used an agent suitable for controlling the molecular weight and/or for inhibiting occurrence of undesirable side reaction such as crosslinking, for example, aliphatic, aromatic or alicyclic mercaptanes, such as n-butylmercaptane, octylmercaptane, dodecylmercaptane, benzylmercaptane, cyclohexylmercaptane.

In the graft polymerization, a copolymerizable monomer may optionally used in addition to the cyanoethylated (meth) acrylic monomer in an amount of not more than 50 parts by weight to 100 parts by weight of the cyanoethylated (meth) acrylic monomer. The copolymerizable monomer includes the same copolymerizable monomers as used in the preparation of fluorine-containing polymer. Suitable examples of those copolymerizable monomer are acrylic esters (e.g. methyl acrylate, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate, etc.); methacrylic esters (e.g. methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl methacrylate, tetrahydrofurfuryl methacrylate, 2-methoxyethyl methacrylate, 2-ethoxyethyl methacrylate, etc.); aromatic vinyl compounds (e.g. styrene, α-methylstyrene, chloromethylstyrene, vinyltoluene, vinylnaphthalene, vinyl(alkyl)phenols, etc.); alicyclic or aromatic hydrocarbon (meth)acrylates (e.g. dicyclopentenyl (meth)acrylate, tricyclodecanyl (meth)acrylate, isobornyl (meth)acrylate, cyclohexyl (meth)acrylate, tetrahydrofurfuryl (meth)acrylate, benzyl (meth)acrylate, etc.); fluoroalkyl (meth)acrylates (e.g. 2,2,2-trifluoroethyl (meth)acrylate, 2,2,3,3-tetrafluoropropyl (meth)acrylate, 2-(perfluoro-3-methylbutyl)ethyl (meth)acrylate, 2,2,3,3,3-pentafluoropropyl (meth)acrylate, 1,1,1,3,3,3-hexafluoropropyl (meth)acrylate, octafluoropentyl (meth) acrylate, etc.); (meth)acrylamides; N-aliphatic, alicyclic or aromatic hydrocarbon-substituted (meth)acrylamides (e.g. N-dimethylacrylamide, N-dibutylacrylamide, N-diphenylacrylamide, etc.), and further vinyl alcohol esters; acrylonitrile; methacrylonitrile; acrylic acid; methacrylic acid; maleic anhydride; maleic acid or its esters; fumaric acid or its esters; itaconic acid or its esters; allyl alcohol or its esters; monovinyl compounds (e.g. vinyl chloride, vinylidene chloride, vinylpyridine, vinylpyrrolidone, vinyl alkyl ethers, vinylidene fluoride, vinylidene cyanate, styrenesulfonic acid); divinylbenzene; polyvalent alcohol—polyhydroxy compound (meth) acrylates; polybasic acids allyl alcohol esters; polybasic acids vinyl alcohol esters; polyvinyl compounds (e.g. allyl (meth)acrylate, etc.); compounds having one or more mercapto groups within the molecule; disulfide compounds; 4-methacryloxyethyltrimellitic anhydride; acid phosphoxyethyl methacrylate; vinyl acetate; vinyl propionate; vinyl versatate; butadiene; and the like.

In case of radiation polymerization using γ-ray, there may be used an acid acceptor for taking the produced HF, for example, calcium hydroxide, magnesium oxide, lead oxide, calcium oxide.

The graft polymer obtained by the above method may be used alone or in a composition with other conventional components such as UV-curable resins, thermosetting resins, thermoplastic resins, fillers, dyes and pigments, and any other conventional additives.

The reflective insulating layer composition of the present invention comprises a high dielectric binder resin, a powdery barium titanate, and an ion killer and/or a hydrophobic alkoxysilane compound or its ester or its ether in an appropriate organic solvent (e.g. N,N-dimethylformamide, N,N-dimethylacetamide, ethylcellosolve acetate, dimethyl sulfoxide, N-methyl-2-pyrrolidone, γ-butyrolactone, etc.).

In the reflective insulating layer composition, the powdery barium titanate is incorporated in an amount of 50 to 500 parts by weight, preferably 200 to 400-parts by weight, to 100 parts by weight of the high dielectric binder resin. when the ion killer is used alone, it is incorporated in an amount of 0.1 to 10 parts by weight, preferably 0.5 to 5 parts by weight, to 100 parts by weight of the powdery barium titanate. When the amount of the ion killer is less than 0.1 part by weight, the deterioration of the dielectric characteristics of the insulating layer due to moisturing is not sufficiently improved, and on the other hand, when the amount is over 10 parts by weight, the relative amount of the powdery barium titanate is decreased, which results in lowering of the dielectric constant of the product.

When the hydrophobic alkoxysilane compound is used alone, the amount thereof may be smaller than that of the ion killer and may be in the range of 0.001 to 5 parts by weight, preferably 0.05 to 2 parts by weight, to 100 parts by weight of the powdery barium titanate. When the amount of the hydrophobic alkoxysilane compound is less than 0.001 part by weight, it does not exhibit the desired effects for decreasing the affect from the impurity ions, and on the other hand, when the amount is over 5 parts by weight, the product tends to show too lowering of the dielectric constant.

The ion killer and the hydrophobic alkoxysilane compound are preferably used together in order to exhibit the desired ion scavenging effects more effectively in a smaller amount thereof. The ion killer and the hydrophobic alkoxysilane compound are usually incorporated when the reflective insulating layer composition is prepared, but instead thereof, the starting powdery barium titanate is previously treated with a solution or suspension of the ion killer and/or hydrophobic alkoxysilane compound in water or an organic solvent. However, the latter method is not practical and not economical, because it takes additional step.

The organic dispersion-type EL element comprises a laminate of a backing electrode, a reflective insulating layer, a luminescent layer and a transparent electrode in this order wherein the reflective insulating layer is as mentioned hereinabove. The EL element may be prepared, for example by the following method.

(i) The above reflective insulating layer composition (in the form of a solution in an organic solvent) is applied onto a backing electrode, and thereafter, an organic solvent solution of a high dielectric binder resin and a luminescent powder [for example, a calcined product of a mixture of zinc sulfide or zinc selenide with an activating agent (e.g. Cu Mn, Al, Cl, Br, etc.)] is further applied onto the reflective insulating layer, and the laminated product is dried with heating to form a luminescent layer, and thereafter, a transparent electrode is contact-bonded with heating onto the resulting luminescence layer, or alternatively, (ii) a reflective insulating layer and a luminescent layer are formed on the backing electrode and the transparent electrode respectively in the same manner as described in the above (i), and then both electrodes are contact bonded with heating so that the reflective insulating layer and the luminescent layer are faced to each other.

Effects of the Invention

The organic dispersion-type EL element can eliminate the problem of the conventional EL element comprising a reflective insulating layer and powdery barium titanate such as the deterioration of dielectric characteristics and decrease of life due to impurity ions under high moisture conditions, which effects can be achieved by such a simple means as incorporating an impurity ion killer and/or a hydrophobic alkoxysilane compound. The high dielectric graft polymer of this invention is also useful as a binder resin for preparing dielectric materials for condenser, polymer battery, piezoelectric and pyroelectric materials, and the like.

EXAMPLES

The present invention is illustrated more specifically referring to Preparations, Examples and Reference Examples, but should not be construed to be limited thereto.

Preparations 1 to 5

(1) Preparation of cyanoethylated (meth)acrylic monomer:

A 4% aqueous sodium hydroxide solution (188 g) is added to pentaerythritol (136.15 g, 1 mole) in a four-necked flask and the mixture is stirred. Thereto is added dropwise acrylonitrile (164.1 g, 3 moles), and the mixture is subjected to Michael addition reaction at 40°–45° C. After completion of the reaction, the reaction mixture is moved to a separatory funnel, washed with water and extracted with methylene chloride. The extract is distilled to remove methylene chloride to give a cyanoethylated compound (0.2 mole). To the product are added methacrylic acid (52 g, 0.6 mole), p-toluenesulfonic acid (3.2 g), hydroquinone (a polymerization inhibitor, 0.03 g) and benzene (200 g) and the mixture is subjected to estrification reaction under reflux temperature. The reaction mixture is washed with water to remove excess methacrylic acid to give a cyanoethylated (meth) acrylic monomer. This product is identified by IR and NMR.

(2) Preparation of graft polymer (radiation polymerization using γ-ray):

The components as shown in the following Table 1 are mixed in the amounts (part by weight) as shown therein, and the mixture is irradiated by γ-ray of cobalt-60 to give a milky white graft polymer liquid. To the resulting graft polymer liquid is added a mixture of methanol and water (1:1 by weight) to precipitate the graft polymer. The precipitates are collected, washed with water and dried, of which the dielectric constant, dielectric loss factor, and the rate of moisture absorption (wt. %) are measured.

The dielectric constant and dielectric loss factor are measured by an LCZ meter as to a test sample which is prepared by applying a solution of the graft polymer/ ethylene glycol monoethyl ether acetate onto an aluminum panel (thickness 1 mm), drying at 120° C. for 30 minutes to form a film having a thickness of about 100 μm, and thereon depositing aluminum in vacuum. The rate of moisture absorption is determined by measuring increase of weight after saturating moisture at 40° C. and 90% relative humidity (RH) as to a test sample which is prepared by applying the same solution in an organic solvent as used above to a glass plate (25×50×1 mm) and then drying at 120° C. for 1.5 to 2 hours. The results are shown in Table 1.

TABLE 1

| Components | Ex. 1 | Ex. 2 | Ex. 3 | Ex. 4 | Ex. 5 |
|---|---|---|---|---|---|
| F-containing polymer | | | | | |
| "DielG-801"*1 | 50 | — | — | 65 | 6.5 |
| "Bitone A"*2 | — | 50 | 30 | — | — |
| Cyanoethylated (meth)acrylic monomer Copolymeriz. monomer | 50 | 50 | 70 | 25 | 25 |
| Me methacrylate | — | — | — | 5 | — |
| "Light EsterM-3F"*3 | — | — | — | — | 5 |
| Dodecylmercaptane | — | — | — | 0.5 | 0.5 |
| Me-Et-ketone | 230 | 230 | 230 | 230 | 230 |
| Ca hydroxide | 15 | 15 | 15 | 15 | 15 |
| Dielectric constant (1 kHz, 20° C.) | 14.1 | 14.0 | 16.0 | 11.6 | 12.0 |
| Dielectric loss factor (1 kHz, 20° C.) | 0.039 | 0.036 | 0.035 | 0.042 | 0.040 |
| Rate of moisture absorption (wt. %) | 0.60 | 0.64 | 0.70 | 0.52 | 0.45 |

*1Vinylidene fluoride type fluororubber (VDF/HFP, specific weight 1.81, Mooney viscosity about 66, containing bromine as radical activating point within the molecule) (manufactured by Daikin Industries, Ltd., Japan)
*2Vinylidene fluoride type fluororubber (manufactured by Dupont, U.S.A.)
*3 2,2,2-Trifluoroethyl methacrylate (manufactured by Kyoeisha Kagaku K.K., Japan)

Preparations 6 to 11

(1) Preparation of graft polymer (solution polymerization):

The components as shown in the following Table 2 are mixed in the amounts (part by weight) as shown therein in a separable flask, and the mixture is subjected to polymerization reaction under nitrogen gas at 80° C. for 3 hours to give a milky white graft polymer liquid. To the resulting graft polymer liquid is added a mixture of methanol and water (1:1 by weight) to precipitate the graft polymer. The precipitates are collected, washed with water and dried, of which the dielectric constant, dielectric loss factor, and the rate of moisture absorption are measured in the same manner as described in the above Examples 1 to 5 (2). The results are shown in Table 2.

TABLE 2

| Components | Ex. 6 | Ex. 7 | Ex. 8 | Ex. 9 | Ex. 10 | Ex. 11 |
|---|---|---|---|---|---|---|
| F-cont. polymer "DielG-801" | 65 | 50 | 35 | 70 | 35 | 25 |
| Cyanoethylated (metha)acrylic monomer Copolymeriz. monomer | 35 | 50 | 65 | 15 | 55 | 60 |
| "Light Ester M-3F" | — | — | — | 15 | 10 | — |
| "Fancryl FA-513M"*4 | — | — | — | — | — | 15 |

TABLE 2-continued

| Components | Ex. 6 | Ex. 7 | Ex. 8 | Ex. 9 | Ex. 10 | Ex. 11 |
|---|---|---|---|---|---|---|
| Benzoyl peroxide | 0.2 | 0.2 | 0.2 | 0.2 | 0.1 | 0.5 |
| Dodecyl mercaptane | — | — | — | 0.15 | 0.06 | 0.4 |
| Me-Et-ketone | 230 | 230 | 230 | 230 | 230 | 230 |
| Dielectric constant (1 kHz, 20° C.) | 13.6 | 14.6 | 15.9 | 10.7 | 12.9 | 11.5 |
| Dielectric loss factor (1 kHz, 20° C.) | 0.023 | 0.023 | 0.025 | 0.032 | 0.024 | 0.022 |
| Rate of moisture absorption (wt. %) | 0.65 | 0.65 | 0.72 | 0.52 | 0.66 | 0.49 |

*4Methacrylic ester of the following formula (manufactured by Hitachi Chemical Co., Ltd., Japan)

Reference Preparations 1 to 3

Reference Preparation 1: The vinylidene fluoride type fluororubber "Deiel G-801" as used in the above Preparations.

Reference Preparation 2: A homopolymer of the same cyanoethylated (meth)acrylic monomer as prepared in the above Preparations 1 to 5 (1).

Reference Preparation 3: A copolymer of the same cyanoethylated (meth)acrylic monomer as prepared in the above Preparations 1 to 5(1) and the same methacrylic ester as the product marked with *4) in the above Table 2.

As to the above products of Reference Preparations 1 to 3, the dielectric constant, dielectric loss factor, and the rate of moisture absorption are measured in the same manner as described in the above Examples 1 to 5 (2). The results are shown in Table 3.

TABLE 3

| | Dielectric constant | Dielectric loss factor | Rate of moisture absorption |
|---|---|---|---|
| Ref. Preparation 1 | 9.6 | 0.011 | 0.46 |
| Ref. Preparation 2 | 17.3 | 0.027 | 2.66 |
| Ref. Preparation 2 | 15.8 | 0.023 | 2.41 |

As is clear from the comparison of the data shown in Tables 1 and 2 and Table 3, the graft polymers of the present invention (Preparations 1 to 11) have higher dielectric constant than that of the fluororubber and have similarly low rate of moisture absorption to that of the latter, and hence, the graft polymers are suitable as a binder resin for the preparation of organic dispersion-type EL element.

Examples 1 to 18 and Reference Examples 1 to 9

The components as shown in Tables 4 and 5 are mixed in the amounts (part by weight) shown in said tables and dispersed with three-roll mill to give reflective insulating layer compositions.

The reflective insulating layer composition is applied onto an aluminum panel (thickness 1 mm) with a doctor blade and dried in a hot-air oven at 120° C. for 2 hours to form a film having a thickness of about 100 μm, and thereon aluminum is deposited in vacuum. The product is kept in a bath having constant temperature and constant humidity (20° C./60% RH or 40° C./90% RH) and the dielectric constant and the dielectric loss factor: tan δ are measured at 1 kHz with an LCZ meter. The results are shown in Tables 4 and 5.

The components in these tables are as follows, wherein binder resins A and B are used in a 33% solution in ethylcellosolve acetate, and binder resins C and D are used in a 33% solution in dimethylformamide, and the part "100" means that of those 33% solutions.

Binder resins

A: A graft copolymer of a cyanoethylated (meth)acrylic monomer—fluorine-containing polymer as prepared in the above Preparation 11.

B: Vinylidene fluoride copolymer type fluororubber, "Diel G-201" (manufactured by Daikin Industries, Ltd., Japan)

C: Cyanoethylated (meth)acrylic polymer type binder resin, as shown in the Reference Preparation 3

D: Cyanoethylated pullulan type binder resin

Powdery barium titanate

A: "BT-100P" (manufactured by Fuji Titanium Kogyo K.K., Japan)

B: "BT-100M" (manufactured by the same company as above)

C: "HPBT-1" (manufactured by the same company as above)

Inorganic ion exchanger

A: "IXE-600" containing Sb, Bi (manufactured by TOA-GOSEI CO., LTD., Japan)

B: "IXE-633" containing Sb, Bi (manufactured by the same company as above)

Hydrophobic alkoxysilane compound

A: Octadecyltrimethoxysilane

B: Methacryloylundecyltrimethoxysilane

TABLE 4

| Components | Ex. 1 | Ex. 2 | Ex. 3 | Ex. 4 | Ex. 5 |
|---|---|---|---|---|---|
| Binder Resin A | 100 | 100 | 100 | 100 | 100 |
| Binder Resin B | — | — | — | — | — |
| Binder Resin C | — | — | — | — | — |
| Binder Resin D | — | — | — | — | — |
| Powdery Barium Titanate A | 100 | 100 | 100 | — | — |
| Titanate B | — | — | — | 100 | — |
| Titanate C | — | — | — | — | 100 |
| Inorganic ion exchanger A | 2 | — | 2 | 2 | 2 |
| exchanger B | — | — | — | — | — |
| Hydrophobic alkoxysilane compound A | — | 0.5 | 0.5 | 0.5 | 0.5 |
| compound B | — | — | — | — | — |
| Dielect. const. | | | | | |
| 20° C./60% RH | 72 | 70 | 62 | 76 | 66 |
| 40° C./90% RH | 108 | 142 | 68 | 81 | 71 |
| Dielectric loss factor: tan δ | | | | | |
| 20° C./60% RH | 0.048 | 0.076 | 0.027 | 0.031 | 0.027 |
| 40° C./90% RH | 0.740 | 0.411 | 0.074 | 0.082 | 0.066 |

TABLE 4-continued

| Components | Ex. 6 | Ex. 7 | Ex. 8 | Ex. 9 | Ex. 10 |
|---|---|---|---|---|---|
| Binder Resin A | — | — | — | 100 | 100 |
| Binder Resin B | 100 | — | — | — | — |
| Binder Resin C | — | 100 | — | — | — |
| Binder Resin D | — | — | 100 | — | — |
| Powdery Barium Titanate A | 100 | 100 | 100 | 100 | 100 |
| Titanate B | — | — | — | — | — |
| Titanate C | — | — | — | — | — |
| Inorganic ion exchanger A | 2 | 2 | 2 | 0.2 | 0.5 |
| exchanger B | — | — | — | — | — |
| Hydrophobic alkoxysilane compound A | 0.5 | 0.5 | 0.5 | 0.05 | 0.5 |
| compound B | — | — | — | — | — |
| Dielect. const. | | | | | |
| 20° C./60% RH | 51 | 85 | 90 | 83 | 69 |
| 40° C./90% RH | 54 | 95 | 122 | 105 | 80 |
| Dielectric loss factor: tan δ | | | | | |
| 20° C./60% RH | 0.022 | 0.045 | 0.062 | 0.033 | 0.028 |
| 40° C./90% RH | 0.046 | 0.088 | 0.102 | 0.111 | 0.092 |

| Components | Ex. 11 | Ex. 12 | Ex. 13 | Ex. 14 | Ex. 15 |
|---|---|---|---|---|---|
| Binder Resin A | 100 | 100 | 100 | 100 | 100 |
| Binder Resin B | — | — | — | — | — |
| Binder Resin C | — | — | — | — | — |
| Binder Resin D | — | — | — | — | — |
| Powdery Barium Titanate A | 100 | 100 | 100 | 100 | 100 |
| Titanate B | — | — | — | — | — |
| Titanate C | — | — | — | — | — |
| Inorganic ion exchanger A | 1 | 5 | 2 | 2 | 2 |
| exchanger B | — | — | — | — | — |
| Hydrophobic alkoxysilane compound A | 0.5 | 0.5 | 0.05 | 0.1 | 0.5 |
| compound B | — | — | — | — | — |
| Dielect. const. | | | | | |
| 20° C./60% RH | 69 | 57 | 68 | 67 | 61 |
| 40° C./90% RH | 79 | 64 | 87 | 80 | 75 |
| Dielectric loss factor: tan δ | | | | | |
| 20° C./60% RH | 0.026 | 0.023 | 0.034 | 0.029 | 0.026 |
| 40° C./90% RH | 0.088 | 0.067 | 0.095 | 0.075 | 0.071 |

| Components | Ex. 16 | Ex. 17 | Ex. 18 |
|---|---|---|---|
| Binder Resin A | 100 | 100 | 100 |
| Binder Resin B | — | — | — |
| Binder Resin C | — | — | — |
| Binder Resin D | — | — | — |
| Powdery Barium Titanate A | 100 | 100 | 100 |
| Titanate B | — | — | — |
| Titanate C | — | — | — |
| Inorganic ion exchanger A | 2 | — | 2 |
| exchanger B | — | 2 | — |
| Hydrophobic alkoxysilane compound A | 1 | 0.5 | — |
| compound B | — | — | 0.5 |
| Dielect. const. | | | |
| 20° C./60% RH | 55 | 70 | 72 |
| 40° C./90% RH | 62 | 92 | 102 |
| Dielectric loss factor: tan δ | | | |
| 20° C./60% RH | 0.023 | 0.024 | 0.032 |
| 40° C./90% RH | 0.047 | 0.068 | 0.065 |

TABLE 5

| Components | Ref. Ex. 1 | Ref. Ex. 2 | Ref. Ex. 3 | Ref. Ex. 4 | Ref. Ex. 5 |
|---|---|---|---|---|---|
| Binder Resin A | 100 | 100 | 100 | — | — |
| Binder Resin B | — | — | — | 100 | — |
| Binder Resin C | — | — | — | — | 100 |
| Binder Resin D | — | — | — | — | — |
| Powdery Barium Titanate A | 100 | — | — | 100 | 100 |
| Titanate B | — | 100 | — | — | — |
| Titanate C | — | — | 100 | — | — |
| Dielect. const. | | | | | |
| 20° C./60% RH | 75 | 71 | 74 | 55 | 88 |
| 40° C./90% RH | 1673 | 243 | 325 | 106 | 543 |
| Dielectric loss factor: tan δ | | | | | |
| 20° C./60% RH | 0.057 | 0.044 | 0.036 | 0.021 | 0.028 |
| 40° C./90% RH | 1.261 | 1.122 | 1.045 | 0.061 | 1.305 |

| Components | Ref. Ex. 6 | Ref. Ex. 7 | Ref. Ex. 8 | Ref. Ex. 9 |
|---|---|---|---|---|
| Binder Resin A | — | 100 | 100 | 100 |
| Binder Resin B | — | — | — | — |
| Binder Resin C | — | — | — | — |
| Binder Resin D | 100 | — | — | — |
| Powdery Barium Titanate A | 100 | 66 | — | — |
| Titanate B | — | — | 66 | — |
| Titanate C | — | — | — | 66 |
| Dielect. const. | | | | |
| 20° C./60% RH | 96 | 51 | 55 | 53 |
| 40° C./90% RH | 2230 | 245 | 123 | 147 |
| Dielectric loss factor: tan δ | | | | |
| 20° C./60% RH | 0.056 | 0.045 | 0.040 | 0.046 |
| 40° C./90% RH | 2.454 | 0.533 | 0.103 | 0.989 |

As is clear from the above Tables 4 and 5, the reflective insulating layer composition incorporated with powdery barium titanate is significantly improved in the dielectric characteristics under the high moisture conditions such as 40° C./90%RH by adding an inorganic ion exchanger (ion killer) and/or a hydrophobic alkoxysilane compound.

Examples 19 to 24 and Reference Examples 10 to 13

By using the reflective insulating layer compositions in Examples 1–4, 6 and 7 and Reference Examples 1, 2, 5 and 7 and the luminescent layer compositions comprising the components and amounts (part by weight) as shown in Tables 6 and 7, organic dispersion-type EL elements are prepared by the following procedure, and the luminescent characteristics of the elements are measured at the initial stage as well as after being subjected to aging.

Procedure

An organic dispersion-type EL element is prepared by the following procedure. Indium oxide—tin oxide (ITO) is contact-bonded onto a glass plate to form a transparent electrode and thereon a luminescent layer composition is screen-printed, and the resultant is dried in a hot-air dryer at 120° C. for 30 minutes to form a luminescent layer. Thereafter, a rejective insulating layer composition is screen-printed on the luminescent layer and then dried at 120° C. for 90 minutes to form a reflective insulating layer in the same manner as above, and on the reflective insulating layer a backing electrode is formed by depositing aluminum in vacuum.

As to this organic dispersion-type EL element, the initial luminance (Cd/m$^2$) and luminescent efficiency (Cd/W) with a luminance meter and a wattmeter at a sinusoidal wave of 100 V–500 Hz. Moreover, the organic dispersion-type EL element is continuously lighted with a sinusoidal wave of 75 V–500 Hz for 200 hours under the high humidity condition of 40° C./90%RH without any moistureproof package, and thereafter, the luminance and luminescent efficiency are measured in the same manner as obtained initial data as mentioned above, by which the state of deterioration of the organic dispersion-type EL element is studied. The results are shown in Tables 6 and 7.

In the above procedure, the binder resin for preparing the luminescent layer is the same one as used for preparing the above reflective insulating layer, and the luminescent powder is "Type #50" (zinc sulfide) (manufactured by Silvania Co., U.S.A.), and the solvents are ethylcellosolve acetate for the Binder Resin A and B and dimethylformamide for the Binder Resin C, that is, in Examples 19–23 and Reference Examples 10, 11 and 13 there is used ethylcellosolve acetate, and in Example 24 and Reference Example 12, there is used dimethylformamide.

TABLE 6

|  | Ex. 19 | Ex. 20 | Ex. 21 | Ex. 22 | Ex. 23 | Ex. 24 |
|---|---|---|---|---|---|---|
| Example No. of Reflec. insul. layer compos. (Table 4) Luminescent layer composition | 1 | 2 | 3 | 4 | 6 | 7 |
| Binder Resin A | 10 | 10 | 10 | 10 | — | — |
| Binder Resin B | — | — | — | — | 10 | — |
| Binder Resin C | — | — | — | — | — | 10 |
| Luminescent powder | 30 | 30 | 30 | 30 | 30 | 30 |
| Solvent | 15 | 15 | 15 | 15 | 15 | 15 |
| Initial |  |  |  |  |  |  |
| Luminance | 75 | 77 | 73 | 79 | 65 | 81 |
| Luminescent efficiency | 1.01 | 1.06 | 1.12 | 1.21 | 1.02 | 1.26 |
| After aging |  |  |  |  |  |  |
| Luminance | 64 | 64 | 67 | 70 | 61 | 75 |
| Luminescent efficiency | 0.94 | 0.96 | 1.06 | 1.11 | 0.95 | 1.14 |

TABLE 7

|  | Ref. Ex. 10 | Ref. Ex. 11 | Ref. Ex. 12 | Ref. Ex. 13 |
|---|---|---|---|---|
| Ref. Example No. of Reflec. insul. layer compos. (Table 5) Luminescent layer composition | 1 | 2 | 5 | 7 |
| Binder Resin A | 10 | 10 | — | 10 |
| Binder Resin C | — | — | 10 | — |
| Luminescent powder | 30 | 30 | 30 | 30 |
| Solvent | 15 | 15 | 15 | 15 |
| Initial |  |  |  |  |
| Luminance | 81 | 82 | 86 | 60 |
| Luminescent efficiency | 0.84 | 0.86 | 0.89 | 0.93 |
| After aging |  |  |  |  |
| Luminance | 46 | 43 | 39 | 49 |
| Luminescent efficiency | 0.75 | 0.75 | 0.68 | 0.79 |

As is clear from the above Tables 6 and 7, the organic dispersion-type EL elements prepared by using the reflective insulating layer compositions of Examples 1–4, 6 and 7 (using additives of ion killers and hydrophobic alkoxysilane compounds) of the present invention show superior luminance and luminescent efficiency after aging (having been lighted under high humidity conditions) in comparison with the organic dispersion-type EL elements prepared by using the reflective insulating layer compositions of Reference Examples 1, 2, 5 and 7 (using no such additives).

What is claimed is:

1. A high dielectric graft polymer which is prepared by graft-polymerizing a fluorine-containing polymer selected from the group consisting of vinylidene fluoride, hexafluoropropylene, chlorotrifluoroethylene, tetrafluoroethylene, pentafluoropropylene, and perfluoromethyl vinyl ether with a cyanoethylated (meth) acrylic monomer of the formula (II):

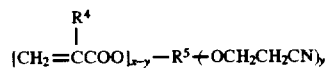

wherein x is an integer of 2 to 4, y is a number satisfying the equation: $1 \leq y \leq x-1$, $R^4$ is H or $CH_3$, and $R^5$ is a member selected from the group consisting of —$CH_2CH_2$—, —CH($CH_3$)$CH_2$—, —$CH_2CH(CH_3)CH_2$—, —$CH_2CH_2CH(CH_3)$—, —$CH_2CH_2CH_2CH_2CH_2CH_2$—, —$CH_2C(CH_3)_2CH_2$—, —$CH_2CH_2OCH_2CH_2$—, —$CH_2CH(CH_3)OCH_2CH$ ($CH_3$) —, —$CH_2CH_2OCH_2CH_2OCH_2CH_2$—.

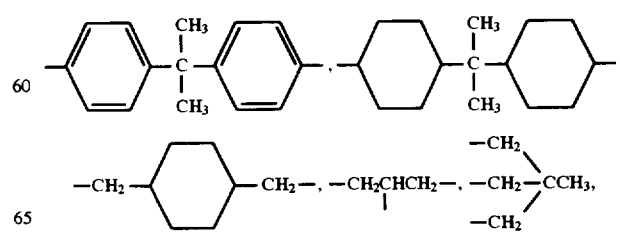

-continued

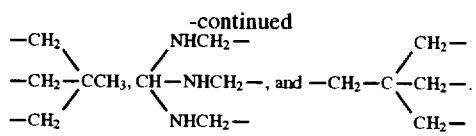

2. The high dielectric graft polymer according to claim 1, wherein the cyanoethylated (meth)acrylic monomer is used in an amount of 10 to 90% by weight based on the total weight of the cyanoethylated (meth) acrylic monomer and the homopolymer or copolymer of a fluorine-containing monomer.

3. The high dielectric graft polymer according to claim 1, wherein the homopolymer or copolymer of a fluorine-containing monomer is a polyvinylidene fluoride, or a copolymer of vinylidene fluoride with at least one of other fluorine-containing monomers selected from the group consisting of hexafluoropropylene, chlorotrifluoroethylene, tetrafluoroethylene, pentafluoropropylene, or perfluoromethyl vinyl ether.

4. The high dielectric graft polymer according to claim 3, wherein the polyvinylidene fluoride is used in a ratio of 50 to 85 mole % to the other fluorine-containing monomer.

5. The high dielectric graft polymer according to claim 1, wherein at least one copolymerizable monomer is used in addition to the cyanoethylated (meth)acrylic monomer.

6. The high dielectric graft polymer according to claim 5, wherein the copolymerizable monomer is used in an amount of 50 parts by weight or less to 100 parts by weight of the cyanoethylated (meth)acrylic monomer.

* * * * *